United States Patent
Hirata et al.

(10) Patent No.: US 7,481,043 B2
(45) Date of Patent: Jan. 27, 2009

(54) PLASMA INJECTOR, EXHAUST GAS PURIFYING SYSTEM AND METHOD FOR INJECTING REDUCING AGENT

(75) Inventors: Hirohito Hirata, Suntho-gun (JP); Eriko Matsumura, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 143 days.

(21) Appl. No.: 10/583,311

(22) PCT Filed: Dec. 15, 2004

(86) PCT No.: PCT/JP2004/019127

§ 371 (c)(1),
(2), (4) Date: Jun. 15, 2006

(87) PCT Pub. No.: WO2005/059325

PCT Pub. Date: Jun. 30, 2005

(65) Prior Publication Data

US 2007/0261397 A1 Nov. 15, 2007

(30) Foreign Application Priority Data

Dec. 18, 2003 (JP) ............... 2003-421358

(51) Int. Cl.
*F01N 3/00* (2006.01)
(52) U.S. Cl. ............... 60/286; 60/275; 60/295; 60/297; 60/303; 422/186.14; 422/186.21; 239/133; 239/134; 239/135
(58) Field of Classification Search ............ 60/274, 60/275, 286, 295, 297, 303; 422/186.04, 422/186.15, 186.16, 186.21, 186.22; 239/132, 239/133, 134, 135
See application file for complete search history.

(56) References Cited

U.S. PATENT DOCUMENTS

| | | | | |
|---|---|---|---|---|
| 5,704,321 A | * | 1/1998 | Suckewer et al. | 123/143 B |
| 5,845,480 A | * | 12/1998 | DeFreitas et al. | 60/776 |
| 5,904,127 A | * | 5/1999 | Kemmler et al. | 123/295 |
| 6,247,303 B1 | | 6/2001 | Bröer et al. | |
| 6,655,130 B1 | | 12/2003 | Kirwan et al. | |
| 7,021,048 B2 | * | 4/2006 | Taylor et al. | 60/295 |
| 7,104,224 B2 | * | 9/2006 | Jonson | 123/3 |
| 2002/0194835 A1 | | 12/2002 | Bromberg et al. | |

FOREIGN PATENT DOCUMENTS

| | | |
|---|---|---|
| FR | 2 635 850 A1 | 3/1990 |
| JP | A 5-321634 | 12/1993 |
| JP | A 6-343820 | 12/1994 |
| JP | A 2001-159309 | 6/2001 |
| JP | A 2001-317360 | 11/2001 |

(Continued)

*Primary Examiner*—Binh Q. Tran
(74) *Attorney, Agent, or Firm*—Oliff & Berridge, PLC

(57) ABSTRACT

The present invention provides a plasma injector wherein a reducing agent injected from an injection port (19) at the distal end portion of an injection nozzle (18) is at least partially converted into a plasma; an exhaust gas purifying system; and a method for injecting a reducing agent. Using the plasma injector, the exhaust gas purifying system, and the method for injecting a reducing gas of the present invention, it is possible to vaporize a reducing agent supplied in an injection manner and/or to provide a highly reactive reducing agent from the reducing agent.

14 Claims, 5 Drawing Sheets

FOREIGN PATENT DOCUMENTS

| | | |
|---|---|---|
| JP | A 2001-525902 | 12/2001 |
| JP | A 2002-61556 | 2/2002 |
| JP | A 2002-233733 | 8/2002 |
| JP | A 2003-529012 | 9/2003 |
| JP | 02007100578 A * | 4/2007 .................. 60/275 |

* cited by examiner

PLASMA INJECTOR, EXHAUST GAS PURIFYING SYSTEM AND METHOD FOR INJECTING REDUCING AGENT

TECHNICAL FIELD

The present invention relates to an injector for injecting a reducing agent, an exhaust gas purifying system wherein a reducing agent is injected upstream of a catalyst in an exhaust pipe, and a method for injecting a reducing agent in a liquid state.

RELATED ART

FIG. 1 shows a conventional injector which is used for directly injecting a fuel into a combustion chamber of an internal combustion engine. The injector 10 comprises a nearly cylindrical nozzle 12 having a hollow space 13 therein, and a nearly columnar needle valve 14 which slides (moves) in the hollow space 13 in the nozzle 12. The nozzle 12 and the needle valve 14 are disposed such that their axial lines "A" are coaxial. The nozzle 12 is provided with a supply passage 15 communicating with the hollow space 13. The supply passage 15 is connected to a fuel source (not shown), and high-pressure fuel is supplied into the hollow space 13 through the supply passage 15. The fuel to be supplied flows to the distal end portion 18 of the nozzle 12 through an annular path 16 between the needle valve 14 and the inner wall surface of the nozzle 12, and is injected from injection holes 19 at the distal end portion 18 of the nozzle 12. In this injector, the inlet of the injection holes 19 is closed or opened by sliding the needle valve 14 in the hollow space 13 to bring the distal end portion of the needle valve 14 into contact with the inner wall surface of the nozzle distal end portion 18, whereby the injection of a fuel from the injection port 19 is controlled.

Such an injector is used for injecting a fuel into an exhaust pipe through which an exhaust gas from an internal combustion engine flows, and Japanese Unexamined Patent Publication (Kokai) No. 2001-159309 discloses this type of injector. This patent publication document proposes generating an electric discharge in an exhaust pipe by using an electric-discharge apparatus disposed upstream of a catalyst, and injecting a reducing agent upstream of the electric-discharging apparatus. According to this technique, the oxidation from NO into $NO_2$ in the electric-discharge apparatus can be accelerated due to the presence of the hydrocarbon (RC). Also, this patent publication document proposes injecting a reducing agent upstream a catalyst, and generating an electric-discharge plasma on the catalyst. According to this technique, the reaction on the catalyst is further accelerated and the purification activity can be enhanced.

Japanese Unexamined Patent Publication (Kokai) No. 5-321634 describes using electric-discharge plasma for purifying an exhaust gas of a motor vehicle. This patent publication document relates to a PM (particulate matter) purifying apparatus wherein PM in an exhaust gas from a diesel engine is trapped at a PM tarp, and the PM trap is regenerated by supplying fresh air thereto. This patent publication document further proposes adding water to the fresh air supplied to the PM trap and generating OH radicals by providing a corona electric discharge thereto, and thereby promoting combustion of the PM trapped in the PM trap with use of the generated OH radicals.

With respect to the use of an electric-discharge plasma for purifying an exhaust gas of motor vehicles, Japanese Unexamined Patent Publication (Kokai) No. 6-343820 proposes supplying water vapor into a plasma generator, and supplying the obtained water-vapor plasma into an exhaust gas, and thereby oxidizing harmful components in the exhaust gas and rendering the gas harmless. In this patent publication document, it is disclosed that active chemical species such as O, OH, H, $H_2O$ and $O_3$ are obtained by adding water vapor to the plasma generator.

As stated above, an injector for injecting a reducing agent is used in various applications. However, in any of these applications, there is a problem that a reducing agent can not be sufficiently vaporized by merely injecting the reducing agent, especially in a low temperature atmosphere.

If a reducing agent, which is injected into an exhaust pipe through which an exhaust gas from an internal combustion engine flows, is insufficiently vaporized, diffusion of the reducing agent to a catalyst, and the contact between the reducing agent and a catalyst, become insufficient, and thereby purification of the exhaust gas cannot be sufficiently achieved, and unreacted fuel may be discharged to the atmosphere.

It is well-known to use a plasma for purifying an exhaust gas, as stated in the above Japanese Unexamined Patent Publication (Kokai) No. 2001-159309. However, when a fuel is injected into an exhaust gas and then a plasma is generated at the region where the exhaust gas is purified, as per this patent publication document, a large amount of energy is required to a generate plasma and the plasma density obtained thereby becomes small, because all of an exhaust gas flow is converted into a plasma.

Therefore, there are demands for an injector, an exhaust gas purifying system and a method for injecting a reducing agent which enable vaporizing a reducing agent supplied by an injector, and/or easily providing a highly reactive reducing agent, even when the reducing agent is not sufficiently vaporized, by merely injecting it.

DISCLOSURE OF THE INVENTION

The plasma injector of the present invention is an injector for injecting or jetting out a reducing agent. The plasma injector comprises an injection nozzle, and a plasma generator which generates a plasma in the vicinity of an injection port at the distal end portion of the injection nozzle. Further, the plasma injector injects a reducing agent in a liquid droplet state, and at least partially converts the reducing agent injected in a liquid droplet state into a plasma to vaporize the reducing agent.

According to the plasma injector of the present invention, as the reducing agent injected in a liquid droplet state is at least partially converted into a plasma and thereby vaporized, it is possible to instantaneously vaporize the reducing agent, and to optionally convert a reducing agent into low molecular weight components, having high reactivities, by radicalizing and cracking the reducing agent, even under the condition that the reducing agent is not sufficiently vaporized by merely injecting it, especially if a high molecular weight reducing agent is injected at a lower temperature.

Further, according to the plasma injector of the present invention, as the plasma injector is provided with a plasma generator which generates a plasma in the vicinity of a injection port at the distal end portion of the injection nozzle, it is possible to generate a plasma in the vicinity of a injection port at the distal end portion of the injection nozzle, i.e. in a part of an area to which the reducing agent is injected rather than the whole of the area. Therefore, an area wherein a plasma is generated can be small, i.e. a larger plasma density can be obtained with a smaller energy consumption.

In one embodiment of the plasma injector of the present invention, the plasma generator is located at the distal end portion of the injecting nozzle.

According to the embodiment, a plasma can be easily generated in the vicinity at the distal end portion of the injecting nozzle.

In one embodiment of the plasma injector of the present invention, the plasma is an inductive-coupling plasma; the plasma generator located at the distal end portion of the injection nozzle comprises a cup-shaped member surrounding the injection port of the injection nozzle, and an inductive coil surrounding the cup-shaped member; and the cup-shaped member is made of an electromagnetic wave-transmissive material.

According to the embodiment, an inductive-coupling plasma can be generated inside the cup-shaped member and in the vicinity thereof, by supplying a high-frequency current from a high-frequency electric power source to the induction coil such that a magnetic field and then an eddy current are generated inside the cup-shaped member.

In one embodiment of the plasma injector of the present invention, the plasma is an electric-discharge plasma; the plasma generator located at the distal end portion of the injection nozzle comprises a cup-shaped member surrounding the injection port of the injection nozzle; the cup-shaped member is made of an electrically semiconductive material or an electrically conductive material; and the cup-shaped member and the distal end portion of the nozzle are electrically insulated from each other to be coupled electrodes.

According to the embodiment, an electric-discharge plasma can be generated inside the cup-shaped member and in the vicinity thereof, by applying a voltage between the cup-shaped member and the distal end portion of the injection nozzle such that an electric discharge is generated therebetween.

In one embodiment of the plasma injector of the present invention, the plasma is an electric-discharge plasma, a microwave plasma or an inductive-coupling plasma.

The use of an inductive-coupling plasma or a microwave plasma is preferable in view of durability, because electrodes (metal portions) can be prevented from being directly exposed to a high-temperature plasma. As an electric-discharge plasma, an arc discharge plasma and a corona discharge plasma, such as a barrier discharge plasma, can be utilized. The use of an arc discharge plasma is preferable in that the output can be easily increased by increasing the electric-discharge current or electric-discharge voltage, and that a stable electric discharge can continue for a long period of time. Also, an arc discharge plasma is preferable in that the apparatus and technique for generating an arc discharge plasma are simple, and the cost of the equipment is relatively low. The use of a barrier electric-discharge plasma is preferable in view of stability of plasma and durability of electrodes.

The exhaust gas purifying system of the present invention is an exhaust gas purifying system wherein a reducing agent is injected upstream of a catalyst located in an exhaust pipe. In the exhaust gas purifying system, the reducing agent is injected by the plasma injector of the present invention.

According to the exhaust gas purifying system of the present invention, it is possible to promote the diffusion of a reducing agent to a downstream catalyst and the contact between a catalyst and a reducing agent, because a reducing agent is vaporized, and optionally converted into low molecular weight components having high reactivity, by the plasma injector of the present invention. This accelerates a reducing reaction on a catalyst, and thereby prevents unreacted reducing agent from being exhausted to the atmosphere.

In one embodiment of the exhaust gas purifying system of the present invention, the catalyst is a $NO_x$ purifying catalyst, particularly a $NO_x$ storage-reduction catalyst or a $NO_x$ selective-reduction catalyst.

According to the embodiment, it is possible to accelerate a $NO_x$ reduction reaction on the catalyst.

Another exhaust gas purifying system of the present invention is an exhaust gas purifying system wherein a reducing agent is injected upstream of a catalyst located in an exhaust pipe by an injector. In the exhaust gas purifying system, a plasma is generated in the vicinity of the injection port of the injector.

According to the exhaust gas purifying system of the present invention, it is possible to radicalize and crack a reducing agent in a small area in the vicinity of the injection port to convert the reducing agent into small molecular weight components having high reactivity, and/or to instantaneously vaporize the reducing agent even under the condition that the reducing agent is not sufficiently vaporized by merely injecting it.

The conversion of a reducing agent into highly reactive components having a small molecular weight and/or the vaporization of a reducing agent enables promotion of the diffusion of the reducing agent to a downstream catalyst and the contact between the reducing agent and the catalyst. This enhances a reducing reaction on the catalyst, and prevents unreacted reducing agent being discharged to the atmosphere. Further, the area wherein a plasma is generated can be small, i.e. a larger plasma density can be obtained with use of a smaller energy consumption, by generating plasma in the in the vicinity of an injection port, i.e. across a part of the diameter of the exhaust pipe rather than across the whole diameter of the exhaust pipe.

The method for injecting or jetting out a reducing agent of the present invention is a method comprising injecting a reducing agent in a liquid drop state, and then at least partially converting the reducing agent injected in a liquid drop state into a plasma to vaporize the reducing agent.

According to the method for injecting a reducing agent of the present invention, when a reducing agent is injected, and particularly when a reducing agent having a higher boiling point is injected at a lower temperature, it is possible to instantaneously vaporize a reducing agent such that the mixing of the reducing agent and air is promoted, even if the reducing agent is not sufficiently vaporized by merely injecting it. Further, in some cases, it is possible to convert a reducing agent into low molecular weight components having high reactivity by radicalizing and cracking the reducing agent.

Using the injector, the exhaust gas purifying system and the method for injecting reducing agent of the present invention, it is possible to convert a reducing agent into low molecular weight components having high reactivity, by radicalizing and cracking the reducing agent supplied in an injection manner, and/or to instantaneously vaporize the reducing agent, even under the condition that the reducing agent is not sufficiently vaporized, by merely injecting it.

BEST MODE FOR CARRYING OUT THE INVENTION

The present invention is specifically described below based on the embodiments shown in the Figures. Each Figure schematically shows the present invention, but the present invention is not limited to the embodiments.

<Plasma Injector of the Present Invention>

Figure 2:
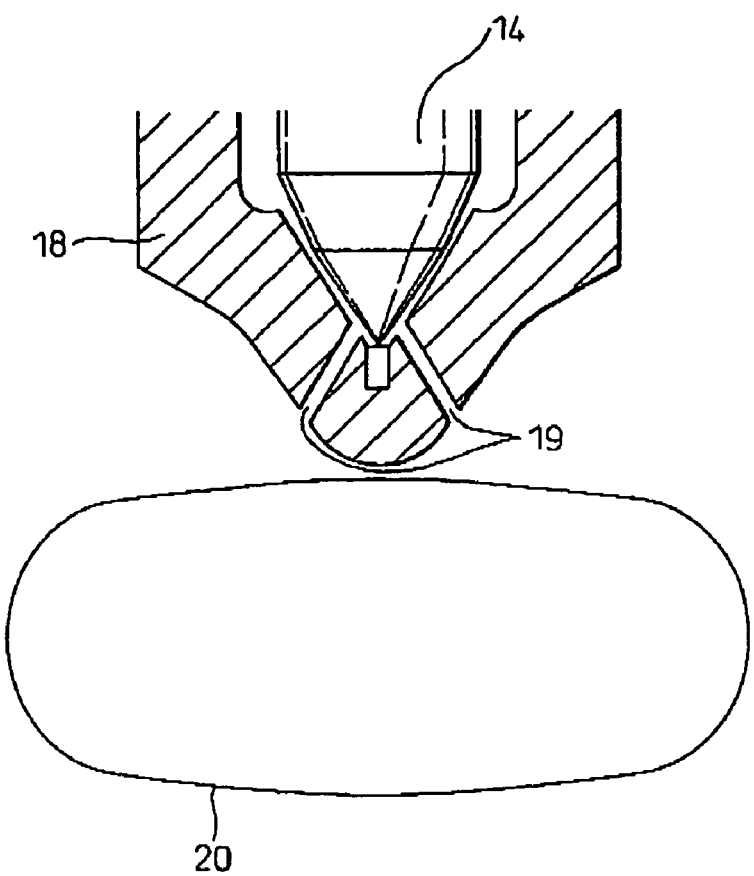
FIG. 2 is a schematic cross-sectional view showing the concept of the plasma injector of the present invention.

The plasma injector of the present invention is schematically described with reference to FIG. 2.

The plasma injector of the present invention can at least partially convert an injected reducing agent into a plasma. The plasma can be generated by injecting a reducing agent from a injection port 19 at the distal end portion 18 of an injection nozzle to a plasma region, particularly to a plasma region in the vicinity of the injection port 19.

A reducing agent to be injected by the injector of the present invention can be arbitrarily selected depending on usage. The reducing agent includes a hydrocarbon such as gasoline and a light oil, an ether, and an alcohol. Incidentally, the term "reducing agent" means a substance which is supplied from an injector to reduce the other substances. That is, it is possible to inject a gasoline into a combustion chamber as a fuel for generating a motive energy by an internal combustion engine, and at the same time to inject a gasoline to an exhaust pipe as a "reducing agent" to reduce $NO_x$ in an exhaust gas emitted from the internal combustion engine. Also, a fuel as a motive power source of an internal combustion engine and a "reducing agent" for purifying an exhaust gas may differ from each other.

The nozzle of the plasma injector of the present invention may be any nozzle. For example, the injector of the present invention may have a mechanism of a conventional injector used for injecting a fuel to a combustion chamber of an internal combustion engine, as shown FIG. 1.

In the case where a plasma is generated in a region near the injection port 19 of an injector by the plasma injector of the present invention, this plasma 20 in the vicinity of the injection port 19 is not in the entirety but in a part of a space such as an exhaust pipe whereto a reducing agent is injected by the injector. The plasma 20 may be, for example, in a region within 5 cm, particularly within 2 cm, more particularly within 1 cm, from the injection port 19.

The plasma injector of the present invention can be provided with a plasma generator at the distal end portion 18 of the injection nozzle. The plasma generator at the distal end portion 18 of the injection nozzle can be several plasma generators as shown in FIGS. 3 and 4.

Figure 1:
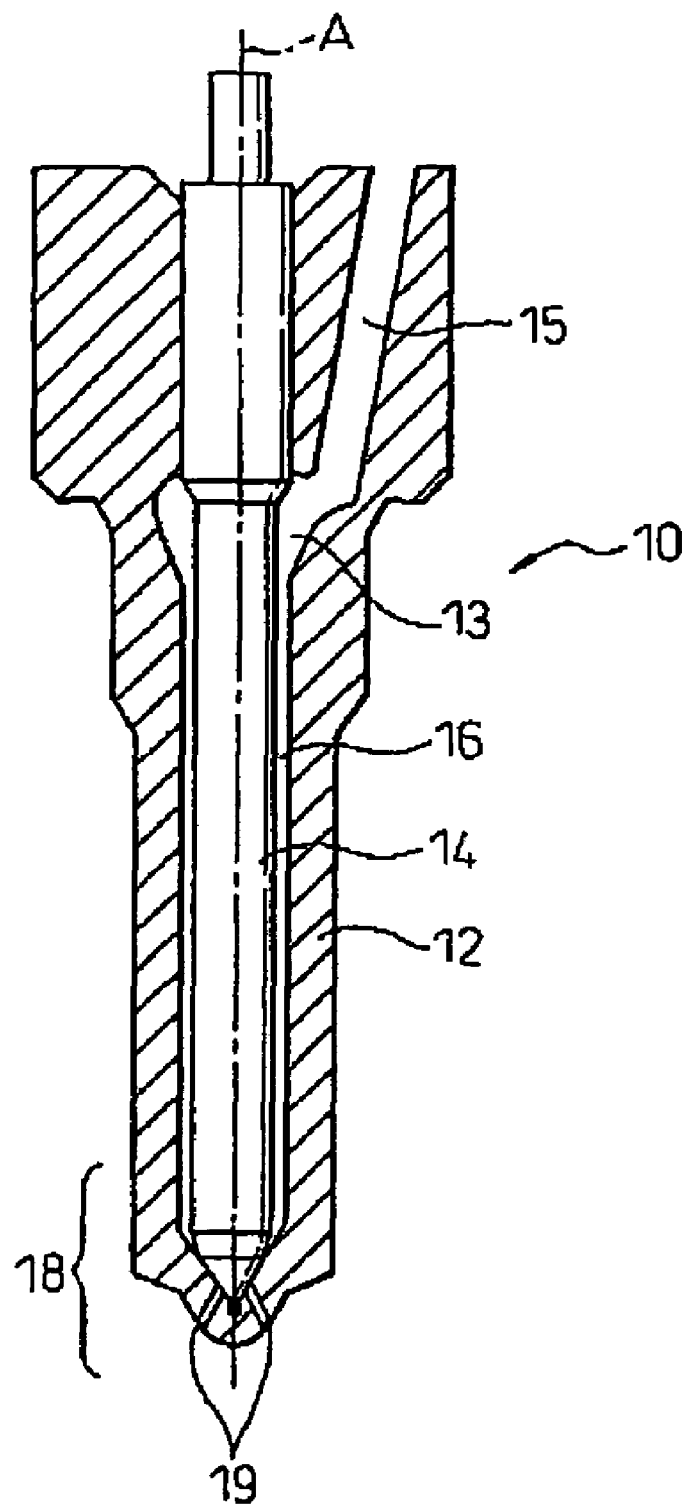
FIG. 1 is an enlarged cross-sectional view of a conventional injector.
Figure 3:
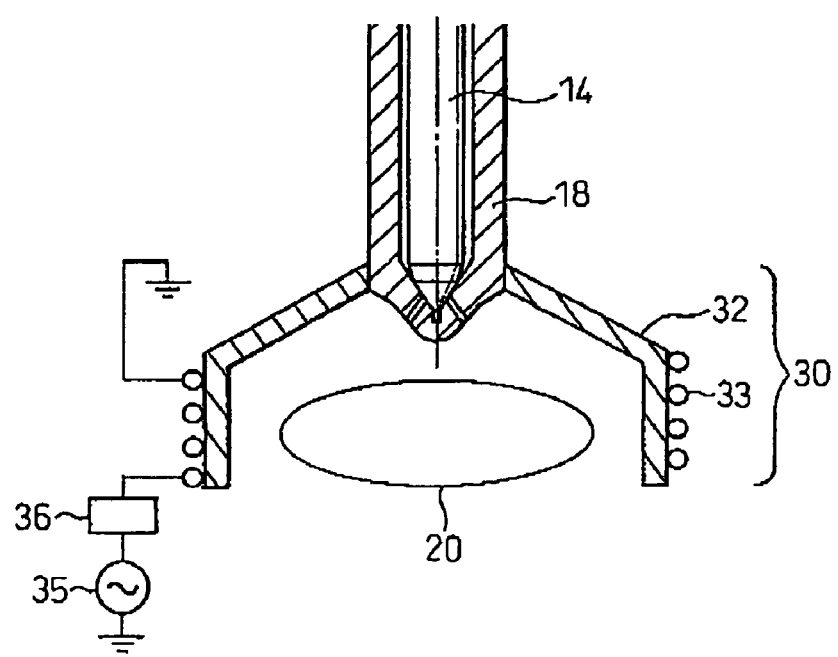
FIG. 3 is a schematic cross-sectional view showing one embodiment of the plasma injector of the present invention wherein an inductive-coupling plasma is utilized.

A plasma generator shown in FIG. 3 generates an inductive-coupling plasma. In the inductive-coupling plasma generator 30, a cylindrical cup 32 is located at the distal end portion 18 of the injection nozzle of the injector as shown in FIG. 1. The cup 32 is formed of an electromagnetic wave-transmitting material and, for example, of an insulative material such as quartz. Around the cup 32, an induction coil 33 for generating an induced electric field is disposed. The induction coil 33 is connected at one end to a high-frequency electric power source 35 via a matching box 36, and is grounded at the other end.

When using the inductive-coupling plasma injector, a high-frequency current is supplied from the high-frequency electric power source 35 to the induction coil 33 while the impedance is adjusted by the matching box 36, such that, inside the cup 32, a magnetic field and then an eddy current are generated, whereby a plasma 20 is inductively generated inside the cup 32 and in the vicinity thereof. As the high-frequency current used here, for example, a current having a frequency of 2 to 50 MHz, particularly from 3 to 40 MHz, can be used.

Figure 4:
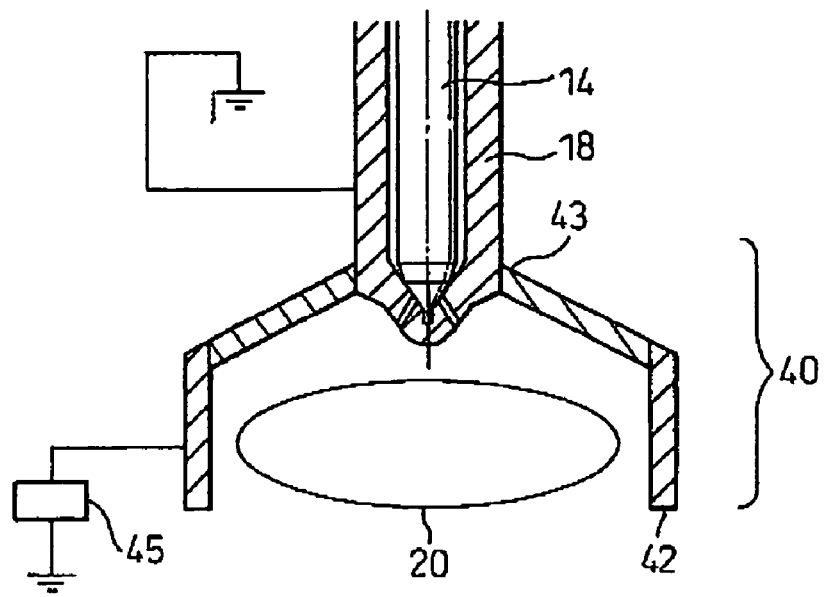
FIG. 4 is a schematic cross-sectional view showing another embodiment of the plasma injector of the present invention wherein an electric-discharge plasma is utilized.

A plasma generator shown in FIG. 4 generates an electric-discharge plasma. In the electric-discharge plasma generator 40, a cylindrical cup 42 is located at the distal end portion 18 of the injection nozzle of the injector as shown in FIG. 1. The cup 42 and the distal end portion 18 of the nozzle are electrically insulated from each other by an insulative material 43. The cup 42 is connected to an electric power source 45, and the distal end portion 18 of the nozzle are grounded, such that the cup 42 and the distal end portion 18 of the nozzle form an electrode pair together. Each of the cup 42 and the distal end portion 18 can be cathode or anode. Although the distal end portion 18 of the nozzle is grounded in FIG. 4, the distal end portion 18 can be connected to an electric power source 45 such that an electric voltage opposite to that applied to the cup 42 is applied to the distal end portion 18.

When using the electric-discharge plasma injector, it is possible to generate an electric discharge between the cup 42 and the distal end portion 18 of the nozzle with use of the electric power source 45, and thereby generate a plasma 20 inside the cup 42 and in the vicinity thereof.

The cup 42 and the distal end portion 18 of the nozzle may be made of any material that makes it possible to apply a voltage and thereby generate an electric discharge therebetween. The material may be an electrically conductive material or a semi-conductive material. The material is preferably a metal such as copper, tungsten, stainless steel, iron, and aluminum. As the material, a material having a high melting temperature such as tungsten is preferable because, and especially in the case of an arc discharge, the electrodes reach a very high temperature. An insulative material can be located on the electrically conductive or semi-conductive material in order to achieve a barrier-electric discharge.

In the case of generating a plasma in the electric-discharge plasma injector by using an arc discharge, the electric power source 45 can supply, for example, a voltage of 1 to 50 V and an electric current of 5 to 500 A. In the arc discharge, the electric discharge is maintained by electrons emitted from a cathode. As for the electric current for generating the arc discharge, not only a direct current (DC) but also an alternating current (AC) can be used.

In the case of generating a plasma in the electric-discharge plasma injector of the present invention by using a corona discharge, the electric power source 45 may supply either a pulsed DC voltage or a pulsed AC voltage. As for the voltage applied between the cup 42 and the distal end portion 18 of the nozzle, a voltage of 1 kV to 100 kV and, for example, 40 kV to 60 kV, can be generally used. The pulse period of the applied voltage may be from 10 ms to 0.1 µs, and particularly from 0.1 µs to 10 µs.

<Exhaust Gas Purifying System of the Present Invention>

Figure 6:
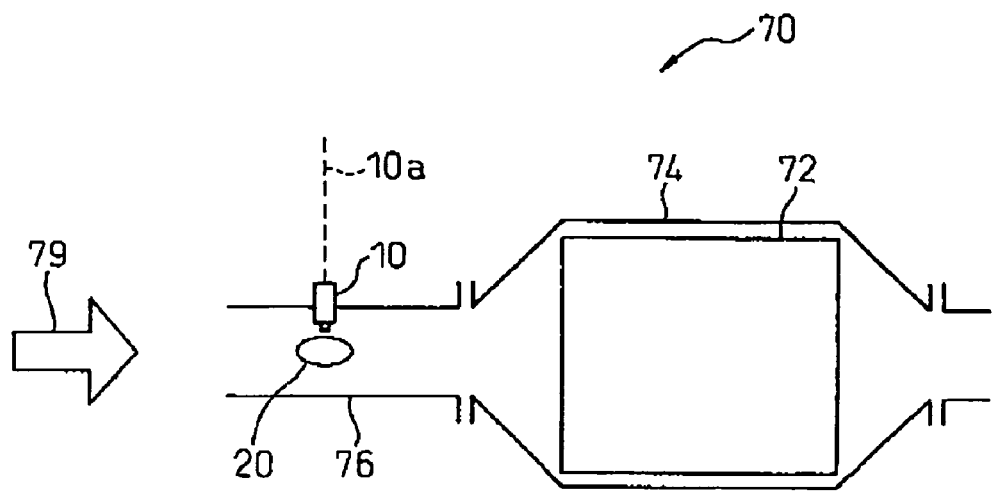
FIG. 6 is a schematic cross-sectional view showing the exhaust gas purifying system of the present invention.

The exhaust gas purifying system of the present invention can be the one shown in FIG. 6.

In FIG. 6, an exhaust gas purifying system 70 of the present invention is shown. The exhaust gas purifying system 70 of the present invention comprises an injector 10; an exhaust pipe 76, a catalyst, especially a $NO_x$ purifying catalyst 72 such as a $NO_x$ storage-reduction catalyst or a $NO_x$ selective-reduction catalyst; and a casing 74. The arrow 74 indicates the direction of an exhaust gas flow. The injection of a reducing agent by the injector 10 can be controlled via a control line 10a. A plasma 20 in the vicinity of the injection port of the injector 10 is shown in the figure. The exhaust gas purifying system 70 of the present invention may be similar to a conventional exhaust gas purifying system, excepting that system is provided with the plasma generator for generating the plasma 20.

In the plasma region 20 in the vicinity of the injection port of the injector 10, a reducing agent injected by the injector 10 can be vaporized and/or converted into small molecular weight components having high reactivity. The plasma-region in the vicinity of the injection port is in a part of an exhaust pipe diameter and not across the whole of the exhaust pipe diameter. The plasma region may be, for example, in a region within 5 cm, particularly within 2 cm, more particularly within 1 cm, of the injection port of the injector 10.

In the exhaust gas purifying system 70 of the present invention, it is possible to inject not only a fuel, such as gasoline and a light oil, used as a motive power source of an internal combustion engine, but also a separate reducing agent, as a reducing agent. The $NO_x$ purifying catalyst which can be used in the exhaust gas purifying system of the present invention is a catalyst for accelerating the reduction of $NO_x$ in an exhaust gas, especially an exhaust gas from an internal combustion engine.

Although a plasma can be usually generated in the exhaust gas purifying system of the present invention, it is preferable, in the view of energy consumption, to generate plasma only at the moment of injecting a reducing agent, particularly only at the moment of injecting a reducing agent under the condition that the system is not sufficiently warmed up.

<Plasma>

As is generally known, a plasma means a state of a substance wherein two or more freely moving positively and negatively charged particles are present together. Accordingly, a substance in a plasma state has a high potential energy, and can convert a reducing agent into low molecular weight components having high reactivity through radical formation and cracking. Further, even when a reducing agent is injected in a liquid drop state, it is possible to vaporize, radicalize and crack the reducing agent to provide low molecular weight components having high reactivity.

In order to generate a plasma for the present invention, any plasma-generating manner can be considered. The present invention is not limited by the manner of generating a plasma and, for example, an electric-discharge plasma, a microwave plasma or an inductive-coupling plasma may be used for the present invention. They are described below.

<Inductive-Coupling Plasm>

An inductive-coupling plasma is a plasma generated in the following manner. A high-frequency current is supplied to an induction coil surrounding around a space wherein a plasma is to be generated such that, inside the induction coil, a magnetic field and then an eddy current are generated, whereby a plasma is inductively generated. As the high-frequency current used here, for example, a current having a frequency of 2 MHz to 50 MHz, particularly from 3 MHz to 40 MHz, can be used.

The inductive-coupling plasma is preferable in the view of durability since electrodes (metal parts) can be prevented from being exposed to a plasma.

<Electric-Discharge Plasma>

An electric-discharge plasma is a plasma generated by the following manner. High-energy electrons produced by an electric discharge between electrodes are forced to collide with gas molecules and, thereby, the gas molecules are ionized into positive ions and negative ions. For generating this discharge plasma, any discharge mode may be used, and an arc discharge, or corona discharge, such as barrier discharge, can be utilized.

In the case of generating a plasma by an arc discharge, for example, a voltage of 1 V to 50 V and an electric current of 5 A to 500 A can be supplied between electrodes. In the arc discharge, the electric discharge is maintained by electrons emitted from a cathode. As an electric current for generating an arc discharge, not only a DC voltage but also an AC voltage can be used.

The arc discharge is advantageous in that the output can be easily increased by increasing a discharge current or discharge voltage, and that a stable electric discharge can continue for a long period of time. Also, in the arc discharge, the apparatus and technique for generating the arc discharge are simple and the cost of equipment is relatively low.

In the case of generating a plasma by a corona electric discharge, a pulsed DC voltage or a pulsed AC voltage can be applied between electrodes. As the voltage applied between electrodes for generating a corona discharge, a voltage of 1 kV to 100 kV and, for example, 40 kV to 60 kV, can generally be used. The pulse period of the applied voltage may be from 0.1 ms to 10 ms or less, and particularly from 0.1 ms to 1 ms. Incidentally, in the view of stability of plasma and durability of electrodes, it is preferable to perform a barrier discharge by disposing an insulative material on the electrodes.

<Microwave Plasma>

A microwave plasma is a plasma generated by the following manner. A microwave generated by a microwave generating device such as a magnetron, for example a microwave at a frequency of about 2.54 GHz, is irradiated from an antenna, via a waveguide, to a region wherein a plasma is generated, and thereby the electric field strength in the region is intensified.

Particularly, in the case of generating a microwave plasma at an atmospheric pressure or at a gas pressure higher than that, it is advantageous to use a plasma-exciting material and generate a plasma in the periphery of the plasma-exciting material by irradiating microwaves onto the plasma exciting material. The plasma-exciting material may be made of any material which promotes generation of a plasma, in the periphery thereof, upon receiving microwave radiation. The plasma-exciting material is, for example, an electrically conductive ceramic and, particularly, is an electrically conductive ceramic sintered body such as an SiC sintered body.

Figure 5:
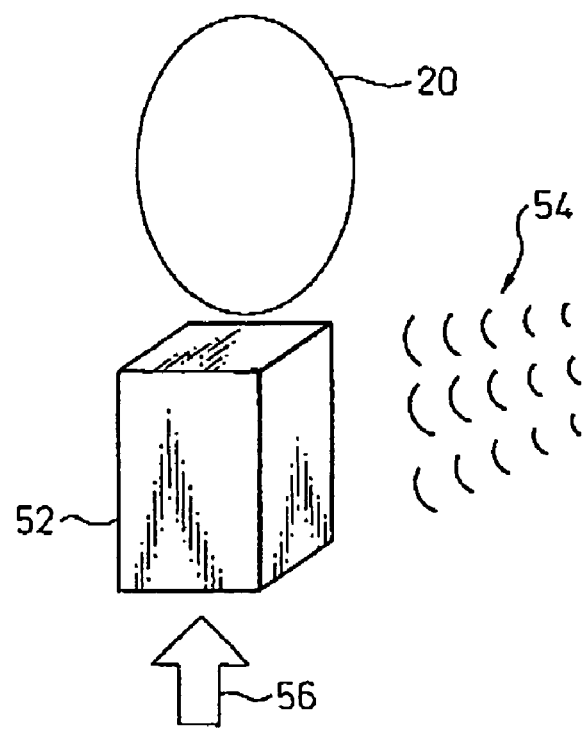
FIG. 5 is a conceptual view showing a mechanism for generating a microwave plasma.

A microwave plasma can be generated by use of a plasma-exiting material as shown in FIG. 5. FIG. 5 shows a SiC sintered body as a plasma-exciting material, a microwave 54 irradiated onto the plasma-exciting material 52, an arrow 56 indicating a gas flow, and a plasma 20 generated.

<Cracking of Reducing Agent by Plasma>

Considering the very high energy state of a plasma, it would be apparent to one skilled in the art that vaporization, radicalization and/or cracking of a reducing agent can be momentarily performed by converting at least a part of a reducing agent into a plasma. In the following description, the cracking and the like caused by converting a hydrocarbon ($C_{13}H_{28}$) into a plasma are experimentally confirmed.

Figure 7:
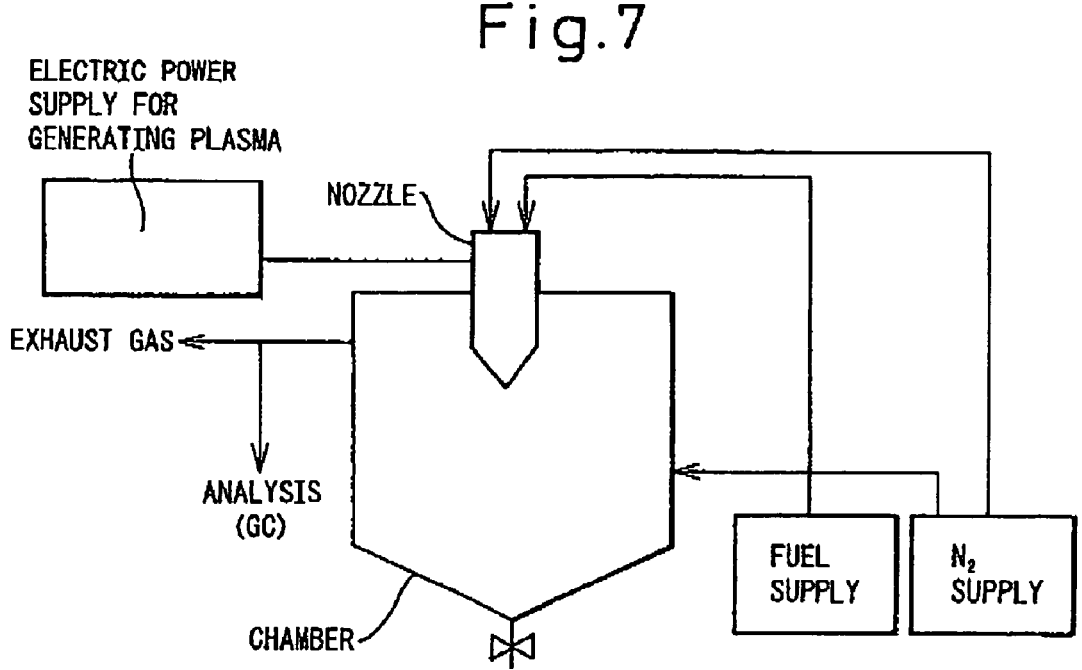
FIG. 7 is a schematic view showing an experimental apparatus for performing cracking of a hydrocarbon molecule by a plasma.

A testing apparatus as shown in FIG. 7 was used. In the experiment, a fuel ($C_{13}H_{28}$) from a fuel supply and $N_2$ as a carrier gas from a $N_2$ supply were mixed and supplied to the chamber via a nozzle. An electric-discharge plasma was generated by generating an electric discharge in the nozzle. In this experiment, it was observed that a discharge plasma was jetted out from the distal end portion of the nozzle. $N_2$ from the $N_2$ supply was also directly supplied to the chamber. A part of the exhaust gas from the chamber was analyzed by a gas chromatograph.

Figure 8:
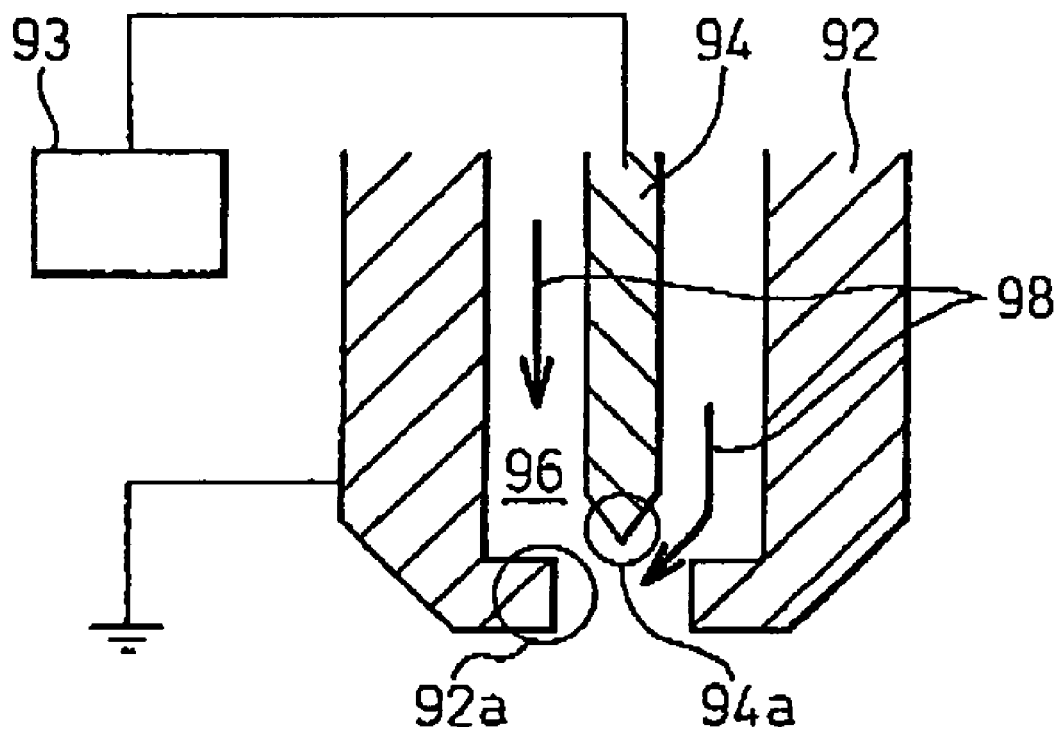
FIG. 8 is a schematic cross-sectional view showing a nozzle used in the experimental apparatus shown in FIG. 7.

FIG. 8 shows the nozzle used in this experiment for generating a plasma. The nozzle shown in FIG. 8 comprises a hollow cylindrical electrode 92 and a rod-like electrode 94 disposed on the central axis of the cylindrical electrode 92. A gas flow path 96 is formed between these electrodes. The arrow 98 shows the gas flow passing through the gas flow path 96. In this nozzle, a voltage is applied between the hollow cylindrical electrode 92 and the rod-like electrode 94 disposed on the central axis of the cylindrical electrode 92 by an electric power source 93, whereby electric discharge is generated between the distal end portion 92a of the hollow cylindrical electrode 92 and the distal end portion 94a of the rod-like electrode 94. Incidentally, a glass pipe is disposed inside the cylindrical electrode to cause a barrier discharge.

According to this experiment, $C_1$ to $C_3$ components were detected by the gas chromatography only when a plasma was generated by an electric discharge. This reveals that the plasma can crack a relatively large molecule ($C_{13}H_{28}$) into relatively small molecules ($C_1$ to $C_3$).

The invention claimed is:

1. A plasma injector for injecting a reducing agent,
   wherein said plasma injector comprises a injection nozzle and a plasma generator which generates a plasma in the vicinity of a injection port at the distal end portion of said injection nozzle;
   wherein said plasma injector injects a reducing agent in a liquid droplet state, and at least partially converts the reducing agent injected in a liquid droplet state into a plasma to vaporize the reducing agent; and
   wherein said plasma generator is located on the distal end portion of said injecting nozzle.

2. The plasma injector according to claim 1, wherein said plasma is an inductive-coupling plasma; wherein said plasma generator located at the distal end portion of said injection nozzle comprises a cup-shaped member surrounding the injection port of said injection nozzle, and an inductive-coil surrounding around said cup-shaped member; and wherein said cup-shaped member is made of an electromagnetic wave-transmissive material.

3. The plasma injector according to claim 1, wherein the plasma is an electric-discharge plasma; wherein said plasma generator located at the distal end portion of the injection nozzle comprises a cup-shaped member surrounding the injection port of said injection nozzle; wherein said cup-shaped member is made of an electrically semiconductive material or an electrically conductive material; and wherein said cup-shaped member and said distal end portion of the nozzle are electrically insulated from each other to form an electrode couple together.

4. The plasma injector according to claim 1, wherein the plasma is an electric-discharge plasma, a microwave plasma or an inductive-coupling plasma.

5. An exhaust gas purifying system, wherein a reducing agent is injected upstream of a catalyst located in an exhaust pipe; and wherein said reducing agent is injected by said plasma injector according to claim 1.

6. The exhaust gas purifying system according to claim 5, wherein said catalyst is a $NO_x$ purifying catalyst.

7. An exhaust gas purifying system, wherein a reducing agent is injected upstream of a catalyst located in an exhaust pipe; and wherein said reducing agent is injected by said plasma injector according to claim 2.

8. An exhaust gas purifying system, wherein a reducing agent is injected upstream of a catalyst located in an exhaust pipe; and wherein said reducing agent is injected by said plasma injector according to claim 3.

9. An exhaust gas purifying system, wherein a reducing agent is injected upstream of a catalyst located in an exhaust pipe; and wherein said reducing agent is injected by said plasma injector according to claim 4.

10. The exhaust gas purifying system according to claim 7, wherein said catalyst is a $NO_x$ purifying catalyst.

11. The exhaust gas purifying system according to claim 8, wherein said catalyst is a $NO_x$ purifying catalyst.

12. The exhaust gas purifying system according to claim 9, wherein said catalyst is a $NO_x$ purifying catalyst.

13. The plasma injector according to claim 1, wherein the plasma is in a region within 5 cm from the injection port.

14. The exhaust gas purifying system according to claim 5, wherein plasma is generated only at the moment of injecting the reducing agent under a condition that the system is not sufficiently warmed up.

* * * * *